Dec. 1, 1931.    D. J. DOLAN ET AL    1,834,690
LICENSE PLATE HOLDER
Filed March 19, 1931
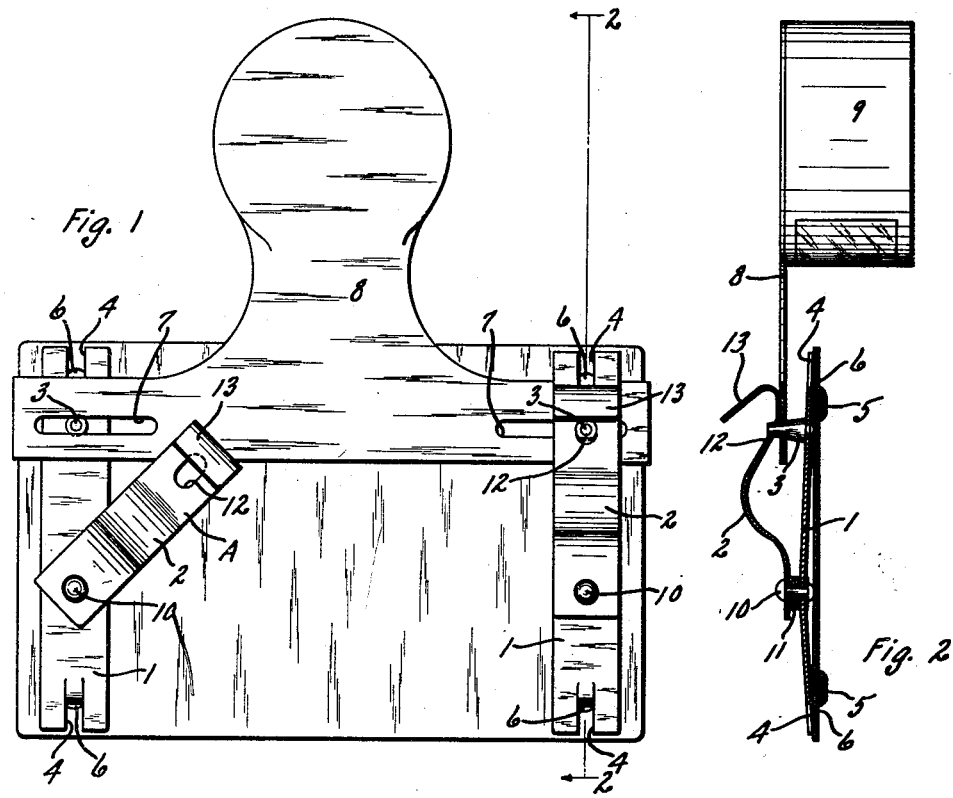
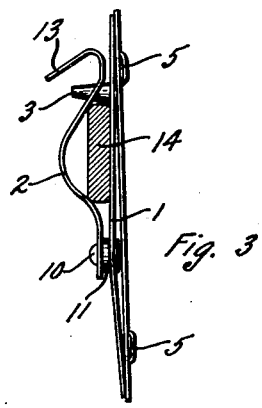
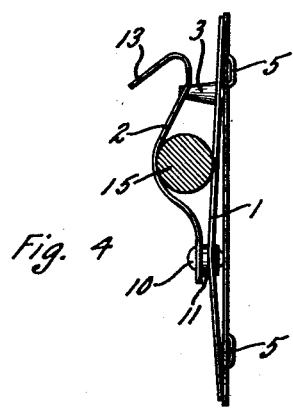
INVENTOR
David J. Dolan
James J. Quinn
BY
Brockett, Hyde, Higley & Meyer
ATTORNEYS Patented Dec. 1, 1931

1,834,690

UNITED STATES PATENT OFFICE

DAVID J. DOLAN, OF CLEVELAND HEIGHTS, OHIO, AND JAMES J. QUINN, OF CHESTER, PENNSYLVANIA

LICENSE PLATE HOLDER

Application filed March 19, 1931. Serial No. 523,678.

This invention relates to means for attaching to automotive vehicles the license plates required to be displayed thereon.

The object of the invention is to provide a device for the purpose, to be permanently attached to the license plate and removably attachable to the vehicle. Particularly, a further object is to provide such a device universally adapted for attachment to any of a number of vehicles having as many different convenient parts from which a license plate might be displayed. Thus it will be apparent that the device of this invention is intended to serve a dealer or the like whose requirements are that a single license plate or set of plates may be used on frequent occasions on different vehicles. Thus the device is once permanently secured to the license plate and thereafter attached to the usual rear license plate holder, the usual front headlight support rod, or the front or rear bumper of any of a number of vehicles.

The exact nature of this invention together with further objects and advantages thereof will be apparent from the following description taken in connection with the accompanying drawings, in which Fig. 1 is a view of the rear license plate holder of an automobile, taken from the back of the holder, showing a license plate partially attached thereto by means of an exemplification of our invention; Fig. 2 is a typical sectional elevation of the same taken as in the plane of line 2—2, Fig. 1; Fig. 3 is a side elevation of the device shown as attached to a bumper of the vehicle, the bumper appearing in cross-section; and Fig. 4 is a view similar to Fig. 3 but illustrating the manner of attachment to a transverse rod of the vehicle such as that between headlights.

With reference now to the drawings, for each license plate a pair of similar devices are employed, one for each side of the plate.

The principal parts of the device are a bar 1, a clip 2, and a post 3. The bar 1 is simply a length of stiff strap metal, of length that of the height of the license plate, and punched out at its ends as at 4 to provide a pair of fingers 5. The size of the fingers and their location is such that when bent to outstand from the bar, they will pass through the bolt openings 6 provided in the license plate. The bar is attached to the license plate by bending down the fingers 5 after passing them through the openings 6 as shown Fig. 2.

The post 3 is secured to the bar near its upper end as by riveting as indicated. The post is slightly tapered also as indicated, and is of such size that it will extend into the opening 7 of the license plate holding bracket 8 provided dependent from the tail light 9 at the rear of the vehicle, but will not entirely pass therethrough—that is, will not allow the bar 1 to come up entirely to the bracket 8.

The clip 2 is secured to the bar 1 as by a rivet 10, a separator washer 11 being positioned on the rivet between the parts for a purpose which will appear. The rivet is not so tight upon the clip but that the clip may be swung thereabout as in the plane of the license plate as indicated at A, Fig. 1. The clip is a spring clip and the relation and proportions of the parts are such that the upper end of the clip will be yieldably urged toward a bearing upon the bar when the clip is swung thereover. The clip is provided with an opening 12 so positioned as to register with the post 3, the size of the opening being such that it will receive the post and move thereover to bear against that portion of the bar 1 thereabout. The clip is turned back at its free extremity as at 13 to provide a handle by which the clip may be sprung over the post, and the intermediate portion of the clip is arched away from the bar as indicated, Figs. 2, 3 and 4.

As stated, two of these devices are secured to a license plate, one at either end thereof and therebehind, and made fast by hammering the fingers 5 down against the front face of the plate.

Supposing now the license plate is to be secured upon the rear bracket 8 of the vehicle, the clips of each device being swung down as at A, Fig. 1. The two posts 3 are inserted one in each of the slots 7 of the bracket, the insertion being from the rear so that the face of the license plate will be presented rearwardly of the vehicle. Next the handle 13 of one of the clips 2 is grasped and the clip swung upwardly and sprung over its post 3. The spring in the clip will draw the parts together forcing or wedging the post tightly into the opening 7. The clip of the other device is then manipulated in the same manner to secure the opposite end of the license plate. Obviously the plate is thereupon so fast with the bracket 8 that no rattle can occur in operation of the vehicle.

When attachment is to be had to one of the bumpers 14 of the vehicle, the parts are so manipulated that the bumper is received between the post 3 and the separator 11, and between the clip 2 and the bar 1, as in Fig. 3. The parts are so proportioned that the upper end of the clip 2 engages the adjacent corner or edge of the bumper, instead of bearing against the bar 1, as indicated in the drawings. Of course, both ends of the license plate are so secured each by one unit device.

When the plate is to be secured upon the headlight support rod 15 of the vehicle, as in Fig. 4, the general arrangement will be as in Fig. 3 except that the rod will now be seated in the curvatures or arches of the clips, as indicated, so as to be clamped between the clips and their bars 1 by the resilience of the clips. Here again the upper extremities of the clips do not bear against their bars 1.

Obviously removal of the plate, together with its securing devices, from the vehicle, can be readily accomplished at any time by simply reversing the method of attachment.

What we claim is:

1. A device of the class described comprising a bar adapted to be secured upright upon the back of a license plate, a post rearwardly extending from the upper portion of said bar, and a spring clip having an opening to receive said post and extending therebelow, with its lower end secured on said bar to maintain its upper end in yieldable engagement with the bar.

2. A device of the class described comprising a bar adapted to be permanently secured upright upon the back of the license plate, said bar having for the purpose integral fingers adapted to be inserted in the bolt openings in the license plate and bent down upon the face of the plate, a post rearwardly extending from the upper portion of the bar, and a spring clip having an opening to receive said post and extending therebelow, with its lower end secured on said bar to maintain its upper end in yieldable engagement with the bar.

3. A device of the class described comprising a bar adapted to be secured upright upon the back of a license plate, a post rearwardly extending from the upper portion of said bar and adapted to be inserted in the bolt opening of a license plate holder of a vehicle, and a spring clip having an opening to receive said post and extend therebelow, with its lower end secured on said bar to maintain its upper end yieldably urged toward said bar, said post being gradually enlarged toward its base to prevent bearing between said bar and said license plate holder.

4. A device of the class described comprising a bar adapted to be secured upright upon the back of a license plate, a post rearwardly extending from the upper portion of said bar, and a spring clip having an opening adapted to receive said post and extending therebelow, with its lower end pivotally secured with said bar to swing thereon in the plane of the plate, whereby said clip may be swung upon said bar and sprung over said post to position its opening about the latter and will there be maintained in yieldable engagement with the bar.

5. A device of the class described comprising a bar adapted to be secured upright upon the back of a license plate, a post rearwardly extending from the upper portion of said bar, and a spring clip having an opening to receive said post and extending therebelow, with its lower end secured on said bar to maintain its upper end in yieldable engagement with the bar, said clip having a portion extending above said opening and bent back to form a handle whereby the clip may be sprung from said post.

6. A device of the class described comprising a bar adapted to be permanently secured upright upon the back of a license plate, a post rearwardly extending from the upper portion of said bar, and a spring clip having an opening to receive said post and extending therebelow, with its lower end secured on said bar to maintain its upper end in yieldable engagement with the bar, said clip having an intermediate portion arched away from said bar to receive a vehicle part upon which the license plate is to be mounted.

7. A device of the class described comprising a bar adapted to be permanently secured upright upon the back of a license plate, a post rearwardly extending from the upper portion of said bar, and a spring clip having an opening adapted to receive said post and extending therebelow with its lower end pivotally secured to said bar to swing in the plane of the plate, and a separator at the pivot to space said clip from said bar whereby a vehicle bumper may be received between the parts and the clip swung thereover without pinching the bumper, said clip being sprung to yieldably urge its free end toward said plate.

In testimony whereof we hereby affix our signatures.

DAVID J. DOLAN.
JAMES J. QUINN.